Feb. 3, 1970   T. J. HARTKA ET AL   3,493,951
LIQUID FLOW DETECTOR
Filed March 30, 1967
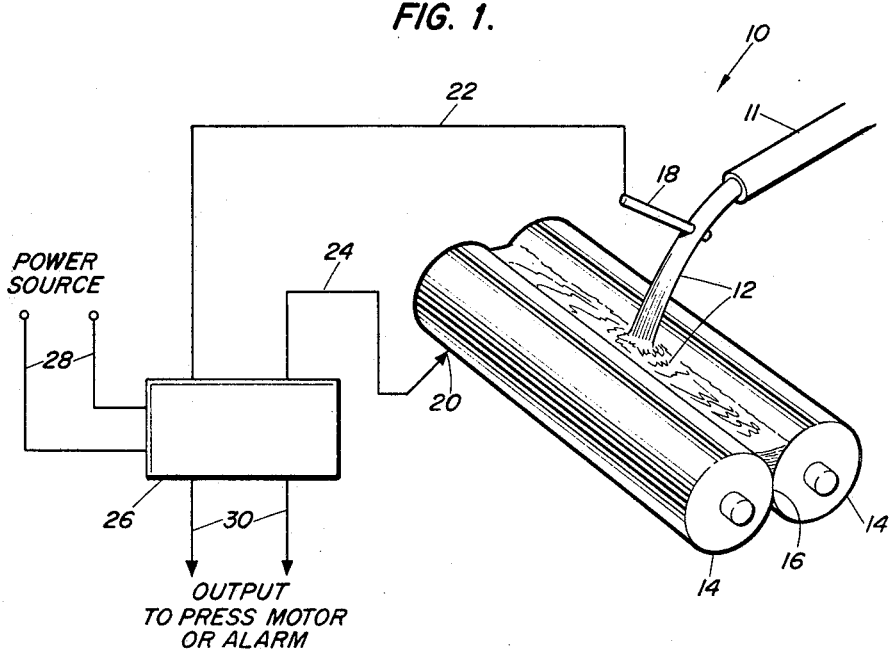
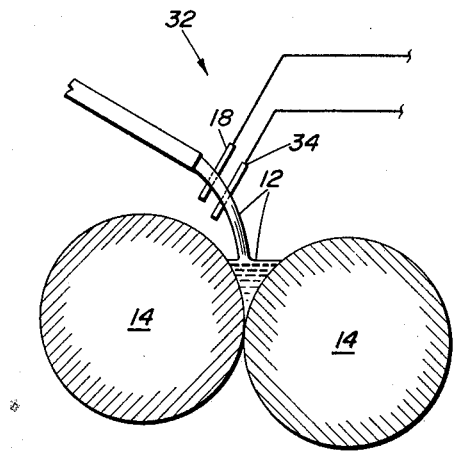
THEODORE J. HARTKA
HENRY D. WARD JR.
INVENTORS
BY *Walter J. Finch*
ATTORNEY 3,493,951
LIQUID FLOW DETECTOR
Theodore J. Hartka, Baltimore, and Henry D. Ward, Jr., Phoenix, Md., assignors to The Ward-Turner Machinery Company, Baltimore, Md., a corporation of Maryland
Filed Mar. 30, 1967, Ser. No. 627,049
Int. Cl. G08b 21/00
U.S. Cl. 340—239     6 Claims

ABSTRACT OF THE DISCLOSURE

Where insufficient liquid for a monitoring device is retained by a reservoir, it is possible to infer its presence there by detecting a replenishing flow. One example of such a problem is that of automatically stopping a printing press should the ink rolls become dry. The solution here is to extend an electrically charged electrode or electrodes into the fountain replenishing jet and cause the resulting electric conduction therealong to make a signal that ink is actually impinging on the rolls. In the absence of ink flow, the electric signal ceases and an alarm sounds or the printing press motor is stopped. An alternate solution to be used where it is undesirable to include the rollers in the electric circuit employs two electrodes, one upstream and one downstream in the jet with the included portion of the jet completing the electric flow.

---

This invention relates generally to electrical alarms, and more particularly it pertains to a liquid flow detector for monitoring of ink flow to printing press fountain rolls.

The usual devices for indicating a supply of liquid are not suitable for use with fountain rolls of printing presses. The amount of ink at these devices is rather small and rules out floats, feelers, optical devices, and the like. Vibration is unusually high at this location on a printing press so the use of dip electrodes is not satisfactory even though it were possible to maintain a larger quantity of ink in the nip.

According to this invention, an apparatus is provided for electrically probing the flow through space of a stream of conducting liquid, specifically printer's ink. As the jet of liquid emerges from a nozzle, it impinges against a charged electrode and thence drains into the nip between fountain rolls. These rolls are grounded and form a discharge path for the electrode charge. With this path complete through the flowing ink, a switch device or electronic circuitry is activated in one sense. With liquid flow suspended, electrical conductance to ground ceases and the switch device or electronic circuitry is activated in another sense.

An object of this invention, therefore, is to provide an electrical signalling arrangement which signals flow continuity of a jet of electrolytic fluids.

Because electrically conductive liquids, including carbon-containing liquids such as printer's ink are prone to deposit stray electrical leakage paths by-passing the insulation of the usual signalling electrodes, it is another object of this invention to provide an electrode probe which may have an unusually long insulation path to its opposite terminal.

Other objects and attendant advantages of this invention will become more readily apparent and understood from the following detailed specification and accompanying drawings in which:

FIG. 1 is a somewhat schematic depiction of an arrangement for monitoring a printing press ink fountain incorporating features of this invention; and FIG. 2 illustrates a modified electrode arrangement for the ink fountain monitor of FIG. 1.

Referring now to the details of the drawings, reference numeral 10 indicates generally a liquid flow detector arrangement incorporating features of this invention. This detector 10 consists of a probe 18, electrically conductive and suitably insulated from grounding to the mechanism including the inking rolls 14 of a printing press or the like (not illustrated).

Reference numeral 11 indicates the usual delivery conduit for the ink which indicated by numeral 12 flows against the probe 18 and thence into the nip 16 of the rolls 14.

Assuming at least the face of the rolls 14 is electrically conductive, a sliding contact 20 thereagainst is provided. Electronic circuitry 26 which, for example, may be of sensitive relay type connects by conductors 22 and 24 to the probe 18 and contact 20, respectively. The power source leads 28 provide energy for the electronic circuitry 26 and charge the probe 18 in operation.

Since the ink 12 is electrically conductive, electric flow is established over the depending jet thereof to the rolls 14 and a return path including contact 20 and lead 24. Leads 30 extend from the electronic circuitry which may, for example, include contacts of a relay. As long as ink 12 completes the conductive circuit previously mentioned, these leads 30 will signal or energize the printing press motor or the like. Otherwise, the printing press motor will stop and an alarm can be sounded.

If the rolls 14 are non-conductive, for example, made of rubber, a modification of a liquid flow detector 32 of this invention is used as shown in FIG. 2. Here, the ground or roll contact 20 is replaced by an additional probe 34 in the jet of ink 12. Otherwise, the circuit operates in the same manner as described, with the return path through conductor 24 including this probe 34.

If desired, a doctoring blade can be substituted for one of said rolls 14 for scraping excess liquid from the surface thereof, with electrical contact being made to said doctoring blade.

Obviously many modifications and variations of the present invention are possible in light of the above teachings. It is, therefore, to be understood that within the scope of the appended claims the invention may be practiced otherwise than as specifically described.

What is claimed is:
1. A detector system for monitoring liquid flow, comprising, a reservoir, means including laterally directed nozzle means for introducing a laterally projected free falling jet of fluid in a continuous fluid stream into said reservoir, and electrical circuitry including at least one probe element positioned in said continuous fluid stream and a second element positioned for contact with a body of fluid from said stream for completing an electrical circuit through said fluid, and means for detecting the electrical flow in said electrical circuitry as a measure of continuity of said stream.

2. A detector system for monitoring liquid flow as recited in claim 1, wherein said reservoir is formed by a pair of parallel spaced rotatable members positioned in said reservoir and having a continuous nip therebetween, with said first mentioned means directed for introducing said free falling fluid stream into said nip of said rotatable members.

3. A detector system for monitoring liquid flow as recited in claim 2, wherein one of said rotatable members has an electrically conductive face, and said second element is in contact with said electrically conductive face of said one rotatable member, and is thereby adapted for electrical contact therethrough serially with fluid in said reservoir, said fluid stream, and said probe element positioned in said fluid stream.

4. A detector system for monitoring liquid flow as recited in claim 2, wherein said rotatable members consist of a pair of inking rolls of a printing press, with one of said rolls having an electrically conductive face, and said second element is positioned in sliding contact with said electrically conductive face of said one roll, thereby being adapted for completing said electrical circuit through the electrically conductive face of said roll, fluid in said reservoir, said fluid stream, and said probe element positioned in said fluid stream.

5. A detector for monitoring liquid flow as recited in claim 2, wherein said second element consists of a second probe element positioned in said fluid stream down stream from said first probe element.

6. A detector system for monitoring liquid flow as recited in claim 1, wherein said reservoir is formed by at least one conductive rotatable member and a conductive doctoring blade positioned adjacent said rotatable member, with said doctoring blade adapted for scraping excess liquid from the surface of said rotatable member and for being in electrical contact through said rotatable member and said liquid to said fluid stream and therethrough to said probe element positioned in said fluid stream.

References Cited

UNITED STATES PATENTS

| | | | |
|---|---|---|---|
| 2,970,564 | 2/1961 | Warner | 101—363 |
| 3,191,528 | 6/1963 | Jorgensen | 101—350 |
| 3,285,169 | 11/1966 | Hartwig | 101—207 |
| 3,308,648 | 3/1967 | Moulton et al. | 73—23 |
| 3,412,677 | 11/1968 | Kantor | 101—48 |

JOHN W. CALDWELL, Primary Examiner

D. A. HART, Assistant Examiner

U.S. Cl. X.R.

73—23; 101—148; 200—61.04, 61.05; 340—222, 248